Patented July 6, 1954

2,683,168

UNITED STATES PATENT OFFICE 2,683,168

PREPARATION OF ORGANO PHOSPHONYL CHLORIDES

Warren Jensen, Ponca City, Okla., and James O. Clayton, Berkeley, Calif., assignors to California Research Corporation, San Francisco, Calif., a corporation of Delaware No Drawing. Application December 22, 1950, Serial No. 202,396

8 Claims. (Cl. 260—543)

This invention relates to a method of preparing phosphonyl chlorides and the like by the reaction of an organic compound with phosphorus trichloride in the presence of oxygen.

This application is a continuation-in-part of our copending application, Serial No. 86,856 (filed April 11, 1949 which has been abandoned, and was a continuation-in-part of application Serial No. 716,182 (filed December 12, 1946), which has also been abandoned).

Phosphonyl chloride and their derivatives are useful in various arts. For example, certain phosphonyl chloride derivatives (e. g., phosphonic acids and salts and esters thereof) are useful as lubricating oil additives, fire retardants, and textile treatnig agents; others are useful in the preparation of wetting agents, emulsifying agents, plasticizers, dispersing agents; and still others are useful as antistripping agents for asphalt paving compositions, asphalt pipe-coating compositions, etc.

Although these compounds are very useful, any extensive uses thereof have been impeded by the laborious and relatively expensive methods of preparation.

Readily usable methods are available for the preparation of phosphonyl compounds wherein the phosphorus atom is connected directly to an aromatic carbon atom. However, it has been difficult to prepare a phosphonyl compound wherein the phosphorus atom is directly connected to an aliphatic carbon atom. One method which has been used to produce this latter carbon-to-phosphorus linkage consists in heating the hydrocarbon with yellow phosphorus to phosphorize the hydrocarbon, followed by air-blowing to produce phosphonic acids. This method entails the use of high temperatures and the consequent dangers of phosphorus vapors, besides being inefficient. Various methods have revolved around the reaction of phosphorus trichloride with a hydrocarbon, such methods requiring the presence of aluminum chloride or acetic anhydride. These methods are also expensive and inefficient.

Heretofore, only methods comparable with the above have been available for the preparation of phosphonyl compounds having a direct union between a carbon and a phosphorus atom. Now, because of the new reaction disclosed hereinbelow, these phosphonyl compounds may be prepared on a more extensive scale, which should result in and permit a more widespread use of these compounds.

It is a primary object of this invention to provide a means of preparing phosphonyl compounds wherein the phosphorus atom is directly connected to an aliphatic carbon atom.

It is another object of this invention to provide a means of converting an aliphatic carbon-to-hydrogen bond to an aliphatic carbon-to-phosphorus bond.

It is a further object of this invention to provide a more economical means of obtaining organo phosphorus compounds having a carbon-to-phosphorus linkage.

It is a still further object of this invention to provide a means of obtaining organo phosphorus compounds having a carbon-to-phosphorus linkage by a method using inexpensive compounds essentially hydrocarbon in structure and phosphorus trichloride as reactants, which method will proceed without the necessity of using high temperatures and expensive catalysts and will give high yields of useful carbon-to-phosphorus compounds.

These and other objects of this invention will be apparent from the following description and the appended claims.

It has been discovered that organo phosphorus compounds containing a direct carbon-to-phosphorus linkage can be prepared by reacting an organic compound with phosphorus trichloride in the presence of air or oxygen, said organic compound containing at least one aliphatic carbon atom, which aliphatic carbon atom is bonded only to carbon and hydrogen atoms, at least one carbon atom and at least one hydrogen atom, and said organic compound being free of sulfur and selenium.

The following chemical equation shows the reaction which takes place:

(1) 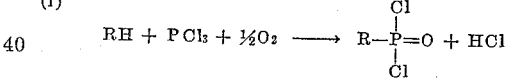

where RH represents the organic compound, which organic compound contains at least one aliphatic carbon atom.

A competing reaction occurs. This competing reaction, which is believed to supply the energy of activation for the above reaction and to be the start of a chain reaction, is as follows:

(2) 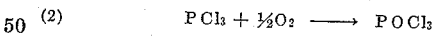

Thus, the reaction mechanism is wholly different from those of the processes formerly used to prepare compounds having a carbon-to-phosphorus linkage.

Organic compounds which may be treated according to the process of this invention to form the carbon-to-phosphorus bond include cycloaliphatic hydrocarbons, such as cyclohexane, methyl cyclohexane, diethyl cyclohexane, cetyl cyclohexane, tetralin, etc.; aliphatic hydrocarbons, such as propane, butane, isobutane, pentane, 2-methyl pentane, 3-methyl pentane, hexane, heptane, octane, isooctane, decane, tetradecane, hexadecane, octadecane, hydrogenated olefin polymers; and aromatic hydrocarbons substituted by aliphatic or cycloaliphatic radicals, such as toluene, xylene, hexylbenzene, cetylbenzene, octadecylbenzene, cyclohexylbenzene, etc. Mixtures of hydrocarbons may be similarly reacted, e. g., gasoline, kerosene, mineral lubricating oil fractions, and paraffin wax. Such mixtures of petroleum origin must be essentially free of sulfur. Also, substituted hydrocarbons, such as chlorinated hydrocarbons, ethers, esters, ketones, etc., and unsaturated hydrocarbons, such as butene-1, isobutene-1, octene-1, isooctene-1, cetene, olefin polymers, etc., may be reacted. Where the substituent or unsaturated linkage is reactive with the phosphorus trichloride or oxygen, such reaction competes with the desired reactions leading to the carbon-to-phosphorus linkage, and may indeed predominate until all of the more reactive group or linkage is consumed. It is, therefore, preferred to use saturated, unsubstituted hydrocarbons, or to use unsaturated, unsubstituted hydrocarbons, or to use unsaturated or substituted hydrocarbons in which the unsaturated group or the substituent is unreactive with phosphorus trichloride and oxygen under the conditions of reaction.

Further examples of organic compounds which may be reacted with phosphorus trichloride and oxygen include ethyl chloride, ethyl fluoride, ethyl bromide, propyl chloride, propyl fluoride, propyl bromide, amyl chloride, dodecyl chloride, cetyl chloride, cetyl bromide, chlorinated petroleum wax, dichloropentane, p-chlorotoluene, p-chlorophenyl ethane, cyclohexyl chloride, diethyl ether, monochlorodiethyl ether, methyl n-butyl ether, isoamyl benzyl ether, anisole, veratrole, phenetole, hydroquinone diethyl ether, tetrahydrofurane, tetrahydropyrane, hexamethyl sorbitol, dibutoxytetraglycol, propyl butyrate, ethyl stearate, isobutyl phthalate, ethyl α-naphthyl acetate, hexyl benzoate, amyl acetate, amyl laurate, diamyl oxalate, di(2-ethylhexyl) phthalate, dioctyl sebacate, glycol laurate, cetyl palmitate, tristearin, trioctyl phosphate and n-amyl benzene sulfonate.

The following examples illustrate the phosphonyl compounds which can be prepared according to the process of this invention: propane phosphonyl chloride, pentane phosphonyl chloride, hexane phosphonyl chloride, decane phosphonyl chloride, cetane phosphonyl chloride, dodecane phosphonyl chloride, butane phosphonyl chloride, hexene phosphonyl chloride, isobutane phosphonyl chloride, isobutene phosphonyl chloride, cyclohexane phosphonyl chloride, diethyl cyclohexane phosphonyl chloride, cetyl cyclohexane phosphonyl chloride, chlorohexane phosphonyl chloride, chlorodecane phosphonyl chloride, methyl-amyl ketone phosphonyl chloride, propylhexyl ketone phosphonyl chloride, phenylmethyl phosphonyl chloride, phenylhexane phosphonyl chloride, phenylacetane phosphonyl chloride, petroleum wax phosphonyl chloride, propylbutyrate phosphonyl chloride, ethylstearate phosphonyl chloride, isobutyl phthalate phosphonyl chloride, amyl acetate phosphonyl chloride, dioctyl sebacate phosphonyl chloride, trioctyl phosphate phosphonyl chloride, diethyl ether phosphonyl chloride, monochlordiethyl ether phosphonyl chloride, etc.

It has been found that certain elements, when present in the organic compound or in the reaction mixture, inhibit the formation of the carbon-phosphorus bond according to the method of the present invention. For example, when sulfur or selenium are present per se or present as a part of the organic compound, the reaction of the present invention does not take place. It has been noted that sulfur and selenium prevent the oxidation of phosphorus trichloride by oxygen according to the reaction noted in Equation 2 hereinabove. Since this oxidation appears to be the first step in a chain reaction leading to the formation of a phosphonyl chloride, inhibition of the oxidation prevents the reaction of the present invention.

When nitro groups ($-NO_2$) are present in certain compounds (e. g. p-nitrotoluene), no reaction takes place between the aliphatic carbon atom and the phosphorus trichloride in the presence of oxygen. It is believed that this is not due to inhibition of the oxidation of phosphorus trichloride, but to steric hindrance or resonance effects. As is normally true in all reactions, it is obvious that where steric hindrances are too strong, or where resonance effects are powerful, the reaction of this invention takes place with difficulty, if at all. Such steric hindrances and resonance effects are less felt by aliphatic carbon atoms which are further removed from the aromatic ring, as in nitro-phenyl decane, for example.

Although phosphorus trifluoride may be used in place of phosphorus trichloride, the latter is much preferred. Air, of course, is the preferred oxidizing agent to be used in the reaction, but other forms of gaseous oxygen, such as pure oxygen and commercial oxygen, may be used.

The reaction may be carried out in the gaseous or liquid phase, the temperature varying from elevated temperatures to subzero temperatures. However, it is preferred to operate well below cracking temperatures of the organic compound reactant. The most advantageous range of temperature is about −70° C. to about +75° C.

The proportions of reactants may be varied considerably. As the molar ratio of phosphorus trichloride to organic compound is increased, the yield of phosphonyl chloride, based on organic compound charged, increases. Thus, in a specific case where petroleum white oil was reacted with phosphorus trichloride and oxygen, as the molar ratio of the phosphorus trichloride to hydrocarbon was increased from 0.25 to 2.0, the yield of phosphonyl chloride (based on hydrocarbon) increased from 7.5 to 44.5%. However, as this molar ratio was increased, the proportion of phosphorus trichloride converted to phosphorus oxychloride also increased. Hence, in any given case, the ratio chosen will depend upon relative costs of hydrocarbon and phosphorus trichloride.

The rate of addition of oxygen does not appear to affect the yield or purity, but as the rate of oxygen input is increased, evolution of heat also increases and more cooling is usually necessary. It is preferred to use an excess of oxygen, but it is also generally beneficial to use such an amount as will permit maintaining the reaction temperature between 0° and 75° C.

The physical conditions under which the reaction is carried out will depend to a considerable degree upon the nature of the reactants. Thus, phosphorus trichloride is relatively volatile (boiling point, 76° C.), hence, unless pressure is used or unless a recovery system for vaporized phosphorus trichloride is used, the reaction temperature will be kept below 76° C. Where a volatile hydrocarbon reactant, such as propane or butane, is employed, it may be necessary to use a pressure system for the reactants. Similarly, if the reaction is made at a temperature above that of the boiling point of phosphorus trichloride (76° C.), it may be necessary to use a pressure system.

Where a normally gaseous hydrocarbon is reacted, the gaseous hydrocarbon and oxygen may be bubbled through liquid phosphorus trichloride. Where the hydrocarbon is normally liquid, it may be mixed with phosphorus trichloride, and oxygen may be bubbled through the mixture. Where the hydrocarbon is normally solid, it may be melted or dissolved in a suitable solvent, such as carbon tetrachloride and treated as in the case of normally liquid hydrocarbons. Another suitable reaction solvent is benzene.

Methods of recovery and treatment of reaction products will likewise depend in a large degree upon the nature of the materials used, and also upon the ends in view. Thus, where the resultant phosphonyl chloride can be distilled without decomposition, recovery can be effected by fractional distillation, and, if necessary, vacuum distillation may be used. Unreacted hydrocarbon, phosphorus trichloride (if any), and phosphorus oxychloride will come off first, followed by the phosphonyl chloride.

Phosphonyl chlorides produced by the reaction of the invention may be treated with water to produce the corresponding phosphonic acids by hydrolysis. Where the resulting phosphonic acids are water-soluble, they may be extracted with water. Where the phosphonic acids produced by hydrolysis are water-insoluble, the reaction mixture may be extracted with an aqueous alcoholic solution of caustic alkali, and the alkaline extract acidified to precipitate the free acids.

The phosphonic acids may be reacted with basic substances to form the corresponding salts. For example, the phosphonic acids may be reacted with sodium hydroxide to prepare the sodium salts of the phosphonic acids. Other metal salts which may be prepared include the potassium, lithium, selenium, calcium, barium, zinc, aluminum, lead, etc.

This reaction is extraordinarily simple to carry out. Thus, as described in detail in the specific examples below, oxygen is bubbled through a mixture of the organic compound and phosphorus trichloride while the temperature is maintained at 55° to 60° C. Unreacted organic compound and phosphorus oxychloride are removed from the reaction mixture by distillation at reduced pressure. The crude organo-phosphonyl chloride is then distilled off and purified further by redistillation.

The specific examples described hereinbelow will serve further to illustrate the practice and advantages of the invention.

*Example I.—Preparation of cyclohexanephosphonyl chloride and cyclohexanephosphonic acid*

6.5 parts by weight of phosphorus trichloride and 1 part by weight of cyclohexane (molar ratio of PCl₃ to cyclohexane of 4) were mixed together at room temperature and placed in a glass cylinder having a sintered glass bubbling plate at the bottom and fitted with a condenser and a thermometer. When oxygen was bubbled into the solution of cyclohexane and phosphorus trichloride, the temperature quickly rose to 60° C. By means of a water bath, the temperature during the reaction was maintained between 55 to 60° C. The oxygen bubbling was continued until until the exothermic effect ended and the temperature returned to room temperature. The reaction mix was first distilled under vacuum to distill off the cyclohexane, the POCl₃, and the crude cyclohexane phosphonyl chloride. The crude cyclohexane phosphonyl chloride was then distilled at reduced pressure to obtain the pure cyclohexane phosphonyl chloride, which distilled over at temperatures ranging from 127 to 128° and an absolute pressure of 15 mm. of mercury. The following analytical data were obtained on a pure sample which crystallized on standing:

|  | Found | Calculated for $C_6H_{11}POCl_2$ |
| --- | --- | --- |
| P percent | 15.1, 15.1 | 15.4 |
| Cl percent | 33.9, 33.4 | 35.3 |
| Melting Point, °C | 37.0–37.5 |  |

A sample of the above cyclohexanephosphonyl chloride was hydrolyzed with water. The water solution was concentrated to one-fourth its volume and cooled, whereupon colorless needles separated out. The following analytical data were obtained on these crystals:

|  | Found | Calculated for $C_6H_{11}PO(OH)_2$ |
| --- | --- | --- |
| P, percent | 18.7, 18.8 | 18.9 |
| Equivalent wt. (g.) | 82 | 82 |
| Melting Point, °C | 166–167 |  |

*Example II.—Preparation of heptanephosphonyl chloride and heptanephosphonic acid*

5.5 parts by weight of phosphorus trichloride and 1 part by weight of n-heptane (molar ratio of PCl₃ to n-heptane of 4) were mixed together and placed in the same glass apparatus described in Example I. Oxygen was bubbled through this mix at 55 to 60° C. until the reaction was complete, which was noted by the drop in temperature. The following analytical data were obtained on the distilled heptanephosphonyl chloride, which was a colorless liquid distilling over at the temperature range of 166–167° C. at an absolute pressure of 15 mm. of mercury:

|  | Found | Calculated for $C_7H_{15}POCl_2$ |
| --- | --- | --- |
| P, percent | 14.5, 14.5 | 14.3 |
| Cl, percent | 32.7, 33.0 | 32.7 |

The heptanephosphonyl chloride was hydrolyzed with water to give a colorless, viscous liquid. The following analytical data were obtained on this heptanephosphonic acid:

|  | Found | Calculated for $C_7H_{15}PO(OH)_2$ |
| --- | --- | --- |
| P, percent | 16.8, 16.9 | 17.2 |
| Equivalent Wt. (g.) | 89.5 | 90.0 |

*Example III.—Preparation of methylpentanephosphonyl chloride and methylpentanephosphonic acid*

A mixture of 7.9 parts by weight of phosphorus trichloride and 1 part by weight of 3-methylpentane (molar ratio of PCl₃ to 3-methylpentane of 4) was placed in the same glass apparatus described in Example I. Oxygen was bubbled through this mix at 55–60° C. until the reaction was complete. The following analytical data were obtained on the distilled methylpentanephosphonyl chloride and on the methylpentanephosphonic acid resulting from the hydrolysis of the chloride with water.

| The Chloride | Found | Calculated for $C_6H_{13}POCl_2$ |
|---|---|---|
| P, percent | 14.9, 15.4 | 15.3 |
| Cl, percent | 37.0, 37.1 | 35.0 |

| The Acid | Found | Calculated for $C_6H_{13}PO(OH)_2$ |
|---|---|---|
| P, percent | 18.2, 18.5 | 18.7 |
| Equivalent wt. (g.) | 82.9 | 83.0 |
| Melting Point, °C | 127–131 | |

*Example IV.—Preparation of petroleum white oil phosphonyl chloride*

A mixture of 4.1 parts of phosphorus trichloride and 3 parts by weight of petroleum white oil¹ (molar ratio of PCl₃ to white oil of 5) was placed in the same glass apparatus described in Example I. Air was bubbled through the mix at a temperature range of 55–60° C. until the reaction was complete. This product was then hydrolyzed with water to the phosphonic acid, which was shown by the analytical data to contain 5.2% phosphorus; the calculated value for one phosphorus atom per molecule is 5.3% phosphorus.

*Example V.—Preparation of phenyloctadecanephosphonyl chloride and phenyloctadecane phosphonic acid*

A mixture of 1.7 parts by weight of phosphorus trichloride and 1 part by weight of octadecylbenzene was placed in the usual glass apparatus. Oxygen was bubbled through this mix at 55 to 60° C. until the reaction was complete. The phenyloctadecanephosphonyl chloride was hydrolyzed to the phenyloctadecanephosphonic acid.

*Example VI.—Preparation of tetrahydronaphthalene(1,2,3,4)-phosphonyl chloride and tetrahydronaphthalene(1,2,3,4)-phosphonic acid*

A mixture of 4.2 parts by weight of phosphorus trichloride and 1 part by weight of tetrahydronaphthalene(1,2,3,4) was placed in the above-described glass apparatus. Oxygen was bubbled through this mix at 55 to 60° C. until the reaction was complete. The resulting tetrahydronaphthalene(1,2,3,4)-phosphonyl chloride was hydrolyzed to the tetrahydronaphthalene(1,2,3,4)-phosphonic acid.

*Example VII.—Preparation of sulfurized calcium petroleum white oil phosphonate*

A mixture of 100 parts by weight of calcium petroleum white oil phosphonate and 13 parts by weight flowers of sulfur was added to a reaction vessel and stirred vigorously at 164–165° C. for 4 hours. The mixture was cooled to 25° C. and extracted with petroleum ether. The mixture was filtered to remove unreacted sulfur. This extraction with petroleum ether was repeated several times. The petroleum ether was then removed by heating the mixture on a steam plate. The product contained 2.44% calcium, 1.78% phosphorus and 2.59% sulfur.

*Example VIII.—Preparation of sulfurized calcium petroleum white oil phosphonate*

A mixture of 312 parts by weight of petroleum white oil phosphonyl chloride, 51 parts by weight of sulfur dichloride and 120 parts by weight of carbon tetrachloride was placed in a reaction vessel and heated at reflux temperature (with stirring) for 10 hours. The unreacted sulfur dichloride and the carbon tetrachloride were removed by distillation at reduced pressure.

Then a mixture of 75 parts by weight of the above sulfurized petroleum white oil phosphonyl chloride, 25 parts by weight of calcium hydroxide, 40 parts by weight of 95% ethyl alcohol and 90 parts by weight of benzene was placed in a reaction flask and heated at reflux temperature for 5 hours. The unreacted calcium hydroxide was removed by filtration. After the alcohol and benzene had been removed by distillation, the product contained 2.27% calcium, 1.71% phosphorus and 0.98% sulfur.

*Example IX.—Preparation of sulfurized calcium petroleum white oil phosphonate*

A mixture of 145 parts by weight of petroleum white oil phosphonic acid, 26 parts by weight of sulfur dichloride and 120 parts by weight of carbon tetrachloride was placed in a reaction vessel and heated (with stirring) at reflux temperature for 7 hours. Unreacted sulfur dichloride and the carbon tetrachloride were removed by distillation at reduced pressure.

Then a mixture of 60 parts by weight of the above sulfurized petroleum white oil phosphonic acid, 25 parts by weight of calcium hydroxide, 40 parts by weight of 95% ethyl alcohol and 315 parts by weight of benzene was heated at reflux temperature for 5 hours. The unreacted calcium hydroxide was removed by filtration, and the alcohol and benzene were removed by distillation. The product contained 2.35% calcium, 1.58% phosphorus and 2.70% sulfur.

*Example X.—Preparation of the phosphonic acid derivative of diamyl ether*

A mixture of 55.5 parts by weight of diamyl ether and 240 parts by weight of phosphorus trichloride was placed in the usual glass apparatus. Oxygen was bubbled through this mix at 55 to 60° C. until the reaction was complete. The resulting phosphonyl chloride was hydrolyzed to the phosphonic acid. The hydrolyzed product was extracted first with hexane and then with ethyl ether. The reaction products recovered after the solvents had been removed by heating were, in both cases, dark viscous oils. No attempt was made to purify these reaction products.

The analysis of the products of the reaction was as follows:

| Extract | Percent Phosphorus | | $pK_1$* | $pK_2$* |
|---|---|---|---|---|
| | Found | Theory | | |
| Hexane | 9.97 | 13.0 | 4.9 | 10.25 |
| Ether Extract | 14.38 | 13.0 | 4.4 | 9.35 |

¹ The petroleum white oil had an average molecular weight of 500, a naphthene content of 20%, and a paraffin content of 80%.

* The $pK_1$ and $pK_2$ values for phosphonic acids are within the range respectively from about 4 to 5 and from about 9 to 10.

*Example XI.—Preparation of the phosphonic acid derivative of methyl-n-amyl ketone*

A mixture of 35.5 parts by weight of methyl-n-amyl ketone and 213 parts by weight of phosphorus trichloride was placed in the usual glass apparatus. Oxygen was bubbled through this mixture at 55 to 60° C. until the reaction was believed to be complete. The resulting phosphonyl chloride was hydrolyzed to the phosphonic acid, and the hydrolysis product was extracted separately with hexane and ethyl ether. The product recovered from the hexane extract was a light brown liquid and the product recovered from the ether extract was a dark viscous liquid. The ether extracted product, which was not purified, contained 12% phosphorus (theory=16% P.) The $pK_1$ and $pK_2$ values were, respectively, 4.9 and 10.1.

After the phosphonic acid reaction mixture had been extracted with hexane and ethyl ether, the residual aqueous layer was brought to a pH of 3. This aqueous layer was then extracted with ethyl ether and ethyl alcohol. The products recovered from the ethyl ether and alcohol extracts had the following analysis:

| Extract | Percent Phosphorus | | $pK_1$ | $pK_2$ |
| --- | --- | --- | --- | --- |
| | Found | Theory | | |
| Ethyl Ether | 14.08 | 16.0 | 4.4 | 9.5 |
| Ethyl Alcohol | 11.0 | 16.0 | 4.9 | 8.7 |

*Example XII.—Preparation of chlorohexanephosphonic acid*

A mixture of 42.3 parts by weight of n-hexyl chloride and 241 parts by weight of phosphorus trichloride was placed in the usual glass apparatus. Oxygen was bubbled through this mixture at 55 to 60° C. until the reaction was complete. The chlorohexanephosphonyl chloride was hydrolyzed to the chlorohexanephosphonic acid. The chlorohexanephosphonic acid reaction mixture was extracted separately with hexane, ethyl ether and benzene. The product recovered from the ether extract contained 15.8% phosphorus (theory=15.5). The $pK_1$ and $pK_2$ values were, respectively, 4.4 and 9.0.

The hexane extract product was a dark viscous oil, the ether extract product was a dark brown viscous oil, and the benzene extract product was a brown viscous oil.

*Example XIII.—The reaction of isoamyl valerate with phosphorus trichloride in the presence of oxygen*

A mixture of 18 parts by weight of isoamyl valerate and 71 parts by weight of phosphorus trichloride was blended together in the usual glass apparatus. Oxygen was bubbled through the mixture at temperatures ranging from 50 to 60° C. until the reaction was complete. The reaction mixture resulting therefrom was hydrolyzed and extracted with hexane first and then with ethyl ether. The ether extract yielded a dibasic acid having the properties of a phosphonic acid. The $pK_1$ value of this reaction product was 4.7, and the $pK_2$ value was 9.2. There was evidence of splitting of the ester accompanying the phosphonation reaction.

*Example XIV.—Preparation of phenylmethane phosphonic acid*

A mixture of 92 parts by weight of toluene and 137 parts by weight of phosphorus trichloride was placed in the usual glass apparatus. Oxygen was bubbled through the mixture at 55 to 60° C. until the reaction was complete. After the reaction with oxygen, the phosphorus oxychloride was distilled off under reduced pressure. The remaining dark brown viscous tarry residue was hydrolyzed and extracted twice with hot water. The reaction product was recrystallized in water, yielding a light tan crystalline solid having a melting point range of 128 to 138° C. This product contained 19.3% phosphorus (theory=18.02), and the molecular weight was found to be 160.8 (theory=172).

*Example XV.—Preparation of p-chlorophenylmethane phosphonic acid*

A mixture of 44.4 parts by weight of p-chlorotoluene and 240 parts by weight of phosphorus trichloride was placed in a glass apparatus, and oxygen was bubbled through this mixture at 55 to 60° C. until the reaction was complete. After the reaction with oxygen, the whole reaction mixture was slowly poured into 2000 parts by weight of distilled water to hydrolyze the phosphonyl chloride. After three hours of vigorous stirring, the reaction mixture was extracted with hexane, then further extracted with ethyl ether. The ether extract resulted in the recovery of a light brown solid having a melting point ranging from 302 to 310° F. The ether extract product contained 11.59% phosphorus (theory=15.0%) and 16.4% chlorine (theory=17.18%). The $pK_1$ and $pK_2$ values were, respectively, 4.5 and 9.25.

The hexane extract, after removal of the hexane, consisted essentially of unreacted p-chlorotoluene.

*Example XVI.—Preparation of a trichlorethane phosphonic acid*

A mixture of 44 parts by weight of methyl chloroform and 227 parts by weight of phosphorus trichloride was placed in a glass apparatus. Oxygen was bubbled through this mixture at 55 to 60° C. until the reaction was believed to be complete. This reaction mixture was slowly poured into water, then extracted with ethyl ether. The product recovered from the ether extract was a light brown solid containing 7.04% phosphorus (theory=13.4% P) and having a pK value of 5.3.

*Example XVII.—Preparation of phenyl "polypropene" phosphonyl chloride and phosphonic acid*

A "polypropene" benzene was prepared by polymerizing propylene, then reacting this polypropene with benzene using HF as the alkylating catalyst. The average molecular weight of this polypropene benzene was 263.

A mixture of 66 parts by weight of this polypropene benzene and 137 parts by weight of phosphorus trichloride was placed in a glass vessel, and oxygen was bubbled through the mixture. The resulting phenyl polypropene phosphonyl chloride was hydrolyzed to form the corresponding phosphonic acid. The reaction product (not purified) contained 4.6% phosphorus (theory=9.0% P).

*Example XVIII.—Preparation of anisole phosphonic acid*

A mixture of 35.8 parts by weight of anisole and 227 parts by weight phosphorus trichloride was placed in a glass apparatus. Oxygen was bubbled through the mixture at 55 to 60° C. until the reaction was complete. The resulting phosphonyl chloride mixture was hydrolyzed, then extracted with ethyl ether. The product recovered from the ethyl ether extract was a yellow crystalline material containing 9.42% phosphorus and having a $pK_1$ value of 4.2. The analysis of the reaction product here was difficult, due to the low solubility of the phosphonic acid in organic solvents. The phosphonic acid was extremely soluble in water.

The phosphonyl chlorides and the phosphonic acids prepared according to the methods of this invention are useful as intermediates in subsequent preparations. Now, because of the above satisfactory method of preparing phosphonyl chlorides and phosphonic acids, it is possible to use the phosphonyl chlorides and phosphonic acids as intermediates in the preparation of other groups of compounds, some of which are new compounds. Such compounds as noted hereinbelow may be prepared from phosphonyl intermediates.

Various esters of phosphonic acids are prepared by reacting phosphonic acids with esterifying groups. For example, alkyl esters of phosphonic acids are prepared by reacting alkanephosphonyl chlorides with alcohols, as exemplified by the following equation:

(3) 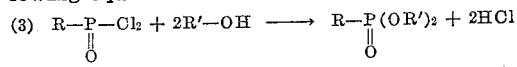

wherein R represents the hydrocarbon structure of the phosphonyl chloride molecule and R' is the hydrocarbon group of the alcohol. The phosphonic acid esters usually are effective as wetting agents, detergents, plasticizers, etc.

Alcohols which may be used include methyl alcohol, ethyl alcohol, propyl alcohol, butyl alcohol, nonyl alcohol, monoesters of dihydric alcohols (e. g., glycol monoacetate), di-esters of trihydric alcohols (e. g., soybean oil fatty acid diglyceride), etc.

The following examples illustrate the method of obtaining esters of phosphonic acids by reacting phosphonyl chloride with aliphatic alcohols according to Equation 3.

*Example XIX.—Dimethyl ester of dodecane phosphonic acid*

Thirty grams of dodecanephosphonyl chloride were added gradually to a solution of 8 grams of methyl alcohol in 30 grams of pyridine. This mixture was heated on a steam bath for 15 minutes, cooled to room temperature, then diluted with 15 grams of water. This mixture was then acidified with hydrochloric acid. The resulting oily upper phase was extracted with 20 grams of ethyl ether, then treated with 25 grams of a 5 per cent (by weight) water solution of sodium sulfate followed by a subsequent washing with 25 grams of a 5 per cent (by weight) water solution of sodium bicarbonate. The ether solution was dried, and the ether removed by evaporation. The resulting ester was almost a colorless oil containing 11.2% phosphorus. The theoretical value for the phosphorus content of the dimethyl ester of dodecane phosphonic acid is 11.1%.

*Example XX.—Dibutyl ester of cyclohexanephosphonic acid*

Twenty grams of cyclohexanephosphonyl chloride were added gradually to a solution of 18 grams of n-butyl alcohol in 30 grams of pyridine. This mixture was heated and treated the same as that of Example XIX to isolate a colorless oil containing 11.1 per cent by weight of phosphorus. The theoretical value of the phosphorus content of the ester is 11.2%.

*Example XXI.—Preparation of soybean oil fatty acid ester of cyclohexanephosphonyl chloride*

A mixture of 1 part by weight of cyclohexanephosphonyl chloride and 5 parts by weight of carbon tetrachloride was placed in a flask and stirred. During the stirring, a mixture of 7.2 parts by weight of soybean oil fatty acid diglyceride and 1 part by weight of pyridine was added slowly at room temperature. This mixture was slowly heated to reflux temperature, and maintained at that temperature for almost 6 hours. The mixture was then washed free of pyridine and pyridine hydrochloride and dried. The carbon tetrachloride was removed by evaporation, using the steam plate. The product contained 2.17% phosphorus; the theoretical value being 2.28%.

Oxyalkylene esters of alkanephosphonic acids are prepared by reacting at least 2 mols of an oxyalkylene compound, for example, an olefin oxide (e. g., ethylene oxide, propylene oxide and butylene oxide) with one mol of an alkanephosphonic acid. This reaction is exemplified by the following equation:

(4) 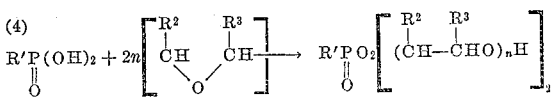

wherein "n" is an integer of 1 to 10, R' represents the hydrocarbon structure of the phosphonic acid, and $R^2$ and $R^3$ represent hydrogen and alkyl groups.

By the term "oxyalkylene," we mean the divalent radical $-(CR'R'')_nO-$, wherein "n" is a whole number of greater than 2; the R' and R'' may be the same or different, and are selected from the group consisting of hydrogen and alkyl groups.

In addition to using the method represented by the above Equation 4, esters of long-chain phosphonic acids are prepared by reacting long-chain alkanephosphonyl dichlorides with compounds containing a terminal hydroxyl group, for example, mono-alkyl ethers of glycols, in the presence of a substance capable of neutralizing the hydrochloric acid formed during the reaction, such as an amine, pyridine, other nitrogen bases and other alkaline substances. Monoalkyl ethers of glycols include the mono-alkyl ethers of ethylene glycol, triethylene glycol, other polyethylene glycols, propylene glycols, butylene glycols, trimethylene glycols and tetramethylene glycols; for example, 2 - methoxy ethanol, 2 - ethoxy ethanol, 2-butoxy ethanol, mono-methyl ether of diethylene glycol, mono-ethyl ether of diethylene glycol, mono-butyl ether of diethylene glycol, or a mono-alkyl ether of any mono-, di-, tri-, or polyalkylene glycol.

This reaction may be exemplified by the following equation:

(5) 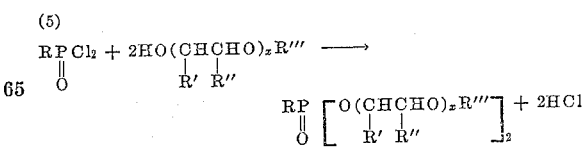

wherein R represents the hydrocarbon structure of the phosphonyl chloride, R and R'' are alkyl groups or hydrogen atoms, R''' is an alkyl group, and $x$ is an integer of 1 to 5.

The following examples illustrate the preparation of the esters of phosphonic acid according to Equation 5:

*Example XXII.* — *Octadecanephosphonic acid ester of the monomethyl ether of ethylene glycol*

To a mixture of 17 parts by weight of the monomethyl ether of ethylene glycol and 30 parts by weight of pyridine was gradually added 37.1 parts by weight of octadecanephosphonyl chloride. The mixture was allowed to stand at room temperature for 15 minutes, then warmed on a steam bath for 20 minutes. The reaction mixture was cooled, diluted with 10 parts of water and acidified with HCl. The upper oily layer was extracted with 25 parts of ether and washed with 50 parts of a half-saturated solution of sodium sulfate. The ethereal extract was dried and the solvent was evaporated to give a light-colored oil which was very slightly soluble in water. The material possessed the formula:

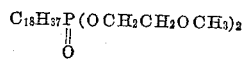

Analysis of the ester:

|  | Theory | Found |
| --- | --- | --- |
| Phosphorus Content | Percent 6.90 | Percent 7.36 |

*Example XXIII.* — *Monobutyl ether of diethylene glycol ester of tetradecanephosphonic acid*

To a mixture of 36 parts by weight of monobutyl ether of diethylene glycol and 30 parts by weight of pyridine was gradually added 33 parts by weight of tetradecanephosphonyl chloride. The ester product was obtained in the same manner as that outlined in Example XXII. This product was a viscous, light-colored liquid which was slightly soluble in water and possessed the following formula:

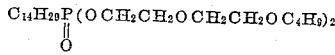

Analysis of the ester:

|  | Theory | Found |
| --- | --- | --- |
| Phosphorus Content | Percent 5.48 | Percent 5.22 |

*Example XXIV.* — *Triethylene glycol ester of octadecanephosphonic acid*

To a mixture of 37.5 parts by weight of triethylene glycol and 30 parts by weight of pyridine was gradually added 37.1 parts by weight of octadecanephosphonyl chloride. The ester product was obtained in the same manner as that outlined in Example XXII. The product was a thick syrupy liquid which had the following formula:

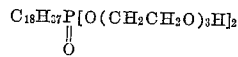

Analysis of the product:

|  | Theory | Found |
| --- | --- | --- |
| Phosphorus Content | Percent 5.2 | Percent 5.6 |

*Example XXV.* — *Ethylene glycol ester of n-hexadecanephosphonic acid*

80 parts by weight of n-hexadecanephosphonic acid were treated portionwise with 30 parts by weight of ethylene oxide. The reaction mixture was allowed to warm to 35° C., at which temperature it was maintained for 30 minutes. The excess ethylene oxide was removed by warming the reaction mixture under reduced pressure to 95° C. The product had the formula:

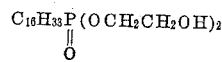

Analysis:

|  | Theory | Found |
| --- | --- | --- |
| Percent Phosphorus | 7.9 | 7.7 |
| Hydroxyl Number | 234 | 280 |

*Example XXVI.* — *Pentaethylene glycol ester of n-octadecanephosphonic acid*

An autoclave was charged with 66.8 parts by weight of n-octadecanephosphonic acid, 90 parts by weight of ethylene oxide and 15 parts by weight of aluminum hydrosilicate. The autoclave was sealed and then heated slowly to 150° C. and maintained at 150–155° C. until the pressure became constant. The product was cooled and filtered to give 155 parts of a straw-colored liquid which has the following formula:

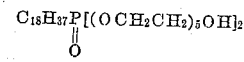

The straw-colored liquid contained 4.0% phosphorus. The theoretical phosphorus value is 3.9%.

*Example XXVII.* — *Preparation of di(diethylene glycol monoethyl ether) petroleum white oil phosphonate*

A mixture of 1 part by weight of the monoethyl ether of diethylene glycol and 1 part by weight of pyridine was placed in a glass reaction vessel. To this mixture was slowly added 1.8 parts by weight of the petroleum white oil phosphonyl chloride of above Example IV. By cooling means, the temperature was kept at about room temperature until all of the white oil has been added. The whole mixture was then heated on a steam bath for 20 minutes, cooled to room temperature, acidified with concentrated hydrochloric acid and washed with water. The ester was extracted with petroleum ether. The petroleum ether solution was dried, then heated on a steam plate to remove the petroleum ether, thereby obtaining the desired phosphonate, which was a viscous liquid.

The following esters are representative of the esters which were prepared of dodecanephosphonic acid, tetradecanephosphonic acid and hexadecanephosphonic acid:

di-(ethylene glycol) ester
di-(diethylene glycol) ester
di-(triethylene glycol) ester
di-(polyethylene glycol) ester
di-(2-methoxy ethanol) ester
di-(2-ethoxy ethanol) ester
di-(2-butoxy ethanol) ester, etc.

Esters of phosphonic acids are also prepared by reacting a phosphonyl chloride with a polyhydroxy alcohol according to the following equation:

(6)

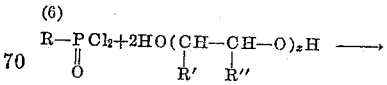

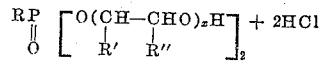

wherein R represents the hydrocarbon structure of the phosphonyl chloride, R' and R'' represent alkyl groups or hydrogen atoms and $x$ represents a positive number having a value from 1 to 5.

Polyhydric alcohols and ethers of polyhydric alcohols which may be used in preparing esters according to the reaction of Equation 6 include ethylene glycol, diethylene glycol, triethylene glycol, a polyethylene glycol, 1,2-propane diol, dipropylene glycol, glycerol, 1,2-butane diol, 1,3-propane diol, 1,5-pentane diol, soybean oil monoglyceride, other fatty acid monoglycerides, erythritol, pentaerythritol, mannitol, sorbitol and substituted polyhydric alcohols such as pentoses, hexoses and polysaccharides.

Under certain conditions when polyhydroxy alcohols are used, cyclic esters are formed; but an excess of the polyhydroxy alcohol tends to prevent the formation of the cyclic ester.

The following examples further illustrate the preparation of those esters according to Equation 6.

*Example XXVIII.—Bis(2-hydroxyethyl) dodecane phosphonate*

To a mixture of 1 part by weight of ethylene glycol and 1.7 parts by weight of pyridine was slowly added 1.6 parts by weight of dodecane phosphonyl chloride. After the mixture had been standing for 15 minutes, it was heated on a steam bath for 20 minutes. The resulting mixture was cooled to room temperature, then diluted with 1 part by weight of water. This diluted mixture was acidified with hydrochloric acid. The resulting upper oily phase was extracted with 20 grams of ethyl ether. The ether solution was washed with a saturated water solution of sodium sulfate, then dried. When the ether had been removed, the product was a light-colored oil having the formula:

$$\underset{\underset{O}{\|}}{C_{12}H_{25}P}(OCH_2CH_2OH)_2$$

*Example XXIX.—Soybean oil ester of cyclohexane phosphonic acid*

A mixture of 1.25 parts by weight of cyclohexanephosphonyl chloride and 2.5 parts by weight of carbon tetrachloride was placed in a flask equipped with a stirrer. During continued stirring, a mixture of 2.25 parts by weight of soybean oil monoglyceride and 1 part by weight of pyridine was added slowly. The whole mixture was heated at reflux temperature for about 6 hours, then washed free of pyridine and pyridine hydrochloride. The resulting product, a light yellow oil, contained 4.52% phosphorus.

New and valuable derivatives of phosphonyl chlorides and phosphonic acids may be obtained by reacting the phosphonyl chlorides or the phosphonic acids with alkylol amines. These new derivates possess surface activity and are useful as wetting, emulsifying, dispersing and detersive agents. Types of derivatives which may be formed by the reaction of phosphonyl chlorides or phosphonic acids with alkylol amines include the amides (e. g.,

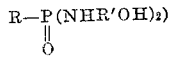

and the cyclic amido esters

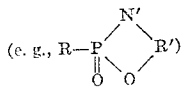

wherein R represents the hydrocarbon structure of the phosphonyl chloride or phosphonic acid and R' represents the hydrocarbon group of the alkylolamines.

To illustrate the reaction of the phosphonyl chlorides with alkylol amines, the following specific examples are submitted:

*Example XXX.—Reaction of monoisopropanolamine with tetradecanephosphonyl chloride*

To 16.5 parts by weight of monoisopropanolamine was added 16.2 parts by weight of tetradecanephosphonyl chloride. During this process of addition, the mixture was shaken and cooled. The whole mixture was warmed on a steam bath for 5 minutes, cooled, diluted with 10 parts by weight of water, and acidified with hydrochloric acid. The reaction product was extracted with 25 parts by weight of ether, washed with 40 parts of water, then dried. The resulting product was a tan-colored, viscous liquid containing 7.70% phosphorus and 4.50% nitrogen.

*Example XXXI.—Reaction of diethanolamine with octadecanephosphonyl chloride*

To 23 parts by weight of diethanolamine was added 19 parts of octadecanephosphonyl chloride. During this process of addition, the mixture was shaken and cooled. The reaction product was obtained in the same manner as Example XXX and contained 6.65% phosphorus.

Further products were obtained by reacting each one of the amines of Table I below with each one of the phosphonyl chlorides of Table II, obtaining 16 reaction products which were excellent wetting agents.

*Table I*

AMINES

1. Monoethanolamine
2. Diethanolamine
3. Monoisopropanolamine
4. Di-isopropanolamine

*Table II*

PHOSPHONYL CHLORIDES

1. Dodecanephosphonyl chloride
2. Tetradecanephosphonyl chloride
3. Hexadecanephosphonyl chloride
4. Octadecanephosphonyl chloride Amides of phosphonyl chloride may be prepared by reacting a phosphonyl chloride with an amine. The following amides exemplify the amides which were prepared from dodecanephosphonyl chloride, tetradecanephosphonyl chloride and hexadecanephosphonyl chloride: Di-(diethylene triamine) amide, di-(triethylene tetramine) amide, di-morpholine amide, di-guanidine amide, etc.

A number of amine salts of phosphonic acids are effective as antistripping agents in asphalt emulsions. These salts are prepared by reacting the phosphonic acids with amines, for example, ethanolamine, triethanolamine, monoethanolamine, amylamine, ammonium hydroxide, naphthylamine, aniline, cyclohexylamine, morpholine, polyamines containing 2 carbon atoms to polymers of polyalkylene polyamines containing 60 or more carbon atoms in the molecule, etc. Examples of polyamines are trimethylene diamine, pentamethylene diamine, tolylene diamine, histamine, methyl guanidine, guanidine, diethyltriamine, tetramethylene pentamine, melamine, diquanide, urea, thiourea, decamethylene diamine, etc.

The following example illustrates the reaction of phosphonic acids with amines to form salts:

*Example XXXII.—Triethanolamine salt of octadecanephosphonic acid*

To an aqueous solution of 30 parts by weight of triethanolamine was added 33.4 parts by weight of octadecanephosphonic acid at room temperature to obtain the triethanolamine salt of octadecanephosphonic acid.

Other amine salts which were prepared include the di-(ethanolamine) salt of dodecanephosphonic acid, the di-(ethanolamine) salt of octadecanephosphonic acid, the di-(diethanolamine) salt of dodecanephosphonic acid, the di-(diethanolamine) salt of octadecanephosphonic acid, the di-(isopropanolamine) salt of dodecanephosphonic acid, the di-(isopropanolamine) salt of octadecanephosphonic acid, the di-(triethanolamine) salt of dodecanephosphonic acid, the di-(triethanolamine) salt of octadecanephosphonic acid, and the mono-(ethanolamine) salt of octadecanephosphonic acid.

We claim:

1. The method of producing organo phosphonyl chlorides which comprises reacting an organic compound containing at least one aliphatic carbon atom, said aliphatic carbon atom being bonded only to carbon atoms and hydrogen atoms, at least one of each, with phosphorous trichloride in intimate contact with oxygen, at temperatures from about −70° C. to about +75° C., said organic compound containing not less than three carbon atoms and being free of sulfur, selenium, and nitrogen.

2. The method of claim 1 wherein the reaction mixture is maintained between about 0° C. and about +75° C.

3. The method of producing aliphatic phosphonyl chlorides, which comprises reacting an aliphatic hydrocarbon containing not less than three carbon atoms with phosphorous trichloride in intimate contact with oxygen, at temperatures from about −70° C. to about +75° C.

4. The method of producing aralkyl phosphonyl chlorides, which comprises reacting an alkyl substituted aromatic hydrocarbon with phosphorous trichloride in intimate contact with oxygen at temperatures from about −70° C. to about +75° C., said alkyl substituent containing at least one aliphatic carbon atom bonded to at least one carbon atom and at least one hydrogen atom.

5. The method of producing cycloaliphatic phosphonyl chloride which comprises reacting a saturated cycloaliphatic hydrocarbon with phosphorous trichloride in intimate contact with oxygen at temperatures from about −70° C. to about +75° C.

6. The method of producing organo phosphonyl chlorides which comprises reacting a mixture of petroleum hydrocarbons having an average molecular weight of about 80 to 450 with phosphorous trichloride in intimate contact with oxygen at temperatures between about −70° C. and +75° C.

7. The method of claim 6 wherein said mixture is kerosene.

8. The method of claim 6 wherein said mixture is a refined lubricating oil fraction.

References Cited in the file of this patent

Michaelis, Annalen, vol. 181, pgs. 280–281 and 301–302 (1876).

Pope et al., J. Chem. Soc., vol. 101, pg. 735 (1912).

Centralblatt, 1910, 11 pgs. 453–454, abstract of Abrusow article.